United States Patent
Mackenbach

(10) Patent No.: US 12,041,181 B2
(45) Date of Patent: Jul. 16, 2024

(54) MANAGEMENT OF A COMPUTING DEVICE SUPPLY CHAIN UTILIZING A DISTRIBUTED LEDGER

(71) Applicant: Dell Products L.P., Round Rock, TX (US)

(72) Inventor: Jeroen Diederik Cornelis Antonius Mackenbach, Roosendaal (NL)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/690,733

(22) Filed: Mar. 9, 2022

(65) Prior Publication Data

US 2023/0291569 A1    Sep. 14, 2023

(51) Int. Cl.
H04L 9/32       (2006.01)
G06Q 10/0875    (2023.01)
H04L 9/08       (2006.01)

(52) U.S. Cl.
CPC ....... H04L 9/3247 (2013.01); G06Q 10/0875 (2013.01); H04L 9/0825 (2013.01); H04L 9/3236 (2013.01)

(58) Field of Classification Search
CPC ... H04L 9/3247; H04L 9/0825; H04L 9/3239; H04L 9/50; H04L 9/3236; G06Q 10/0875
USPC ......................................................... 713/168
See application file for complete search history.

(56) References Cited

U.S. PATENT DOCUMENTS

| | | | | |
|---|---|---|---|---|
| 10,102,500 | B2* | 10/2018 | Fung | G06Q 10/06 |
| 10,931,438 | B2* | 2/2021 | Dender | G06Q 30/0282 |
| 11,475,403 | B2* | 10/2022 | Chappell | G06Q 20/386 |
| 11,488,176 | B2* | 11/2022 | Padmanabhan | G06F 16/953 |
| 11,574,308 | B2* | 2/2023 | Robotham | H04L 9/50 |
| 11,610,041 | B2* | 3/2023 | Dubrulle | G06F 30/15 |

(Continued)

OTHER PUBLICATIONS

The Linux Foundation, "Project Alvarium," https://www.lfedge.org/projects/alvarium/, Accessed Feb. 25, 2022, 3 pages.

(Continued)

*Primary Examiner* — Amare F Tabor
(74) *Attorney, Agent, or Firm* — Ryan, Mason & Lewis, LLP

(57) ABSTRACT

An apparatus comprises a processing device configured to obtain, at a given one of a plurality of computing sites in a supply chain associated with a given computing device, one or more component verification data records associated with the given computing device. The component verification data records are obtained from a distributed ledger maintained by the plurality of computing sites in the supply chain. The component verification data records characterize provisioning actions performed on the given computing device by computing sites in the supply chain. The processing device is also configured to generate component verification data characterizing a current configuration of hardware and software components of the given computing device. The processing device is further configured to determine an authenticity of the given computing device based on validating the generated component verification data for the given computing device utilizing the component verification data records obtained from the distributed ledger.

20 Claims, 8 Drawing Sheets

(56) References Cited

U.S. PATENT DOCUMENTS

| | | | |
|---|---|---|---|
| 11,687,878 B2* | 6/2023 | Becher | H04L 9/3239 |
| | | | 705/29 |
| 11,790,317 B2* | 10/2023 | Javaheri | G06Q 10/0838 |
| | | | 705/29 |
| 2019/0342085 A1* | 11/2019 | Kube | H04L 9/3247 |
| 2020/0065761 A1* | 2/2020 | Tatchell | G06Q 10/0838 |
| 2020/0195448 A1* | 6/2020 | Yang | H04L 9/0643 |
| 2022/0052856 A1* | 2/2022 | Oliver | H04L 63/123 |

OTHER PUBLICATIONS

A. Hayes, "Blockchain Explained," https://www.investopedia.com/terms/b/blockchain.asp, Feb. 16, 2022, 11 pages.

Blockchainhub Berlin, "Blog," https://blockchainhub.net/, Accessed Feb. 25, 2022, 12 pages.

Dell Technologies, "Dell Technologies Secured Component Verification for PowerEdge," Solution Brief, 2020, 2 pages.

Dell Technologies, "Dell Technologies Supply Chain Security: Secured Component Verification for PowerEdge," 2020, 3 pages.

FIDO Alliance, "FIDO UAF Architectural Overview," Draft, Nov. 28, 2017, 9 pages.

Firefly, "The Secure Entrypoint to the IOTA Ecosystem," https://firefly.iota.org/, Accessed Feb. 25, 2022, 13 pages.

Github, "Hyperledger Fabric," https://github.com/hyperledger/fabric, Accessed Feb. 25, 2022, 3 pages.

L. Baird et al., "Hedera: A Public Hashgraph Network & Governing Council," Whitepaper, v.2.1, Aug. 15, 2020, 97 pages.

Hedera Hashgraph, LLC, "Understanding Decentralization of Hedera Hashgraph," V1, Jun. 2021, 11 pages.

T. Kuhrt, "Hyperledger Fabric," https://wiki.hyperledger.org/display/fabric, Accessed Feb. 25, 2022, 3 pages.

Dell EMC, "The Integrated Dell Remote Access Controller 9 (IDRAC9) with Lifecycle Controller," Apr. 6, 2017, 6 pages.

Hyperledger 2020, "Install Fabric and Fabric Samples," https://hyperledger-fabric.readthedocs.io/en/latest/install.html, Accessed Feb. 25, 2022, 3 pages.

Intel Corporation, "Intel Secure Device Onboard," Product Brief, 2017, 4 pages.

S. Popov, "The Tangle," Computer Science, Apr. 30, 2018, 28 pages.

ISO, "ISO 28000:2007 Specification for Security Management Systems for the Supply Chain," https://www.iso.org/standard/44641.html, Sep. 2007, Abstract.

Nen, "ISO 28000:2007 Specification for Security Management Systems for the Supply Chain," https://www.nen.nl/en/nen-iso-28000-2007-en-120583, Oct. 1, 2007, Abstract.

Dell Technologies, "Warranty and Ownership Transfer," https://www.dell.com/support/assets-transfer/en-us, Accessed Feb. 23, 2022, 2 pages.

Intel Corporation, "Intel Secure Device Onboard," Product Brief, 2019, 4 pages.

A. Sunyaev et al., "Token Economy," Business & Information Systems Engineering, vol. 63, Feb. 12, 2021, pp. 457-478.

TCG, "TCG Platform Certificate Profile," Version1.1, Revision 19, Apr. 10, 2020, 59 pages.

Hyperledger 2020, "Using the Fabric Test Network," https://hyperledger-fabric.readthedocs.io/en/release-2.2/test_network.html, Accessed Feb. 25, 2022, 14 pages.

S. Nakamoto, "Bitcoin: A Peer-to-Peer Electronic Cash System," https://bitcoin.org/bitcoin.pdf, 2008, 9 pages.

* cited by examiner

MANAGEMENT OF A COMPUTING DEVICE SUPPLY CHAIN UTILIZING A DISTRIBUTED LEDGER

FIELD

The field relates generally to information processing, and more particularly to device management in information processing systems.

BACKGROUND

Computing devices may be deployed to various customer or other end-user sites after passing through multiple sites in a supply chain. The supply chain may include, for example, a manufacturer or vendor of the computing devices, the customers or end-users of the computing devices, and one or more additional entities that are between the manufacturer or vendor and the customers or end-users. Such additional entities may include, but are not limited to, distributors, value-added resellers, etc. The additional entities may perform provisioning actions on the computing devices. In these and other cases, computing device onboarding at the customer or end-user sites is a complex task, as there is a need for trust between all parties in the supply chain to ensure that the computing devices received at the customer or end-user sites are authentic.

SUMMARY

Illustrative embodiments of the present disclosure provide techniques for management of a computing device supply chain utilizing a distributed ledger maintained by entities in the device supply chain.

In one embodiment, an apparatus comprises at least one processing device comprising a processor coupled to a memory. The at least one processing device is configured to perform the step of obtaining, at a given one of a plurality of computing sites in a supply chain associated with a given computing device, one or more component verification data records associated with the given computing device. The one or more component verification data records are obtained from a distributed ledger maintained by the plurality of computing sites in the supply chain. The one or more component verification data records characterize one or more provisioning actions performed on the given computing device by at least one of the computing sites in the plurality of computing sites in the supply chain. The at least one processing device is also configured to perform the step of generating component verification data for the given computing device. The component verification data characterizes a current configuration of hardware and software components of the given computing device. The at least one processing device is further configured to perform the step of determining an authenticity of the given computing device based at least in part on validating the generated component verification data for the given computing device utilizing the one or more component verification data records associated with the given computing device obtained from the distributed ledger.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
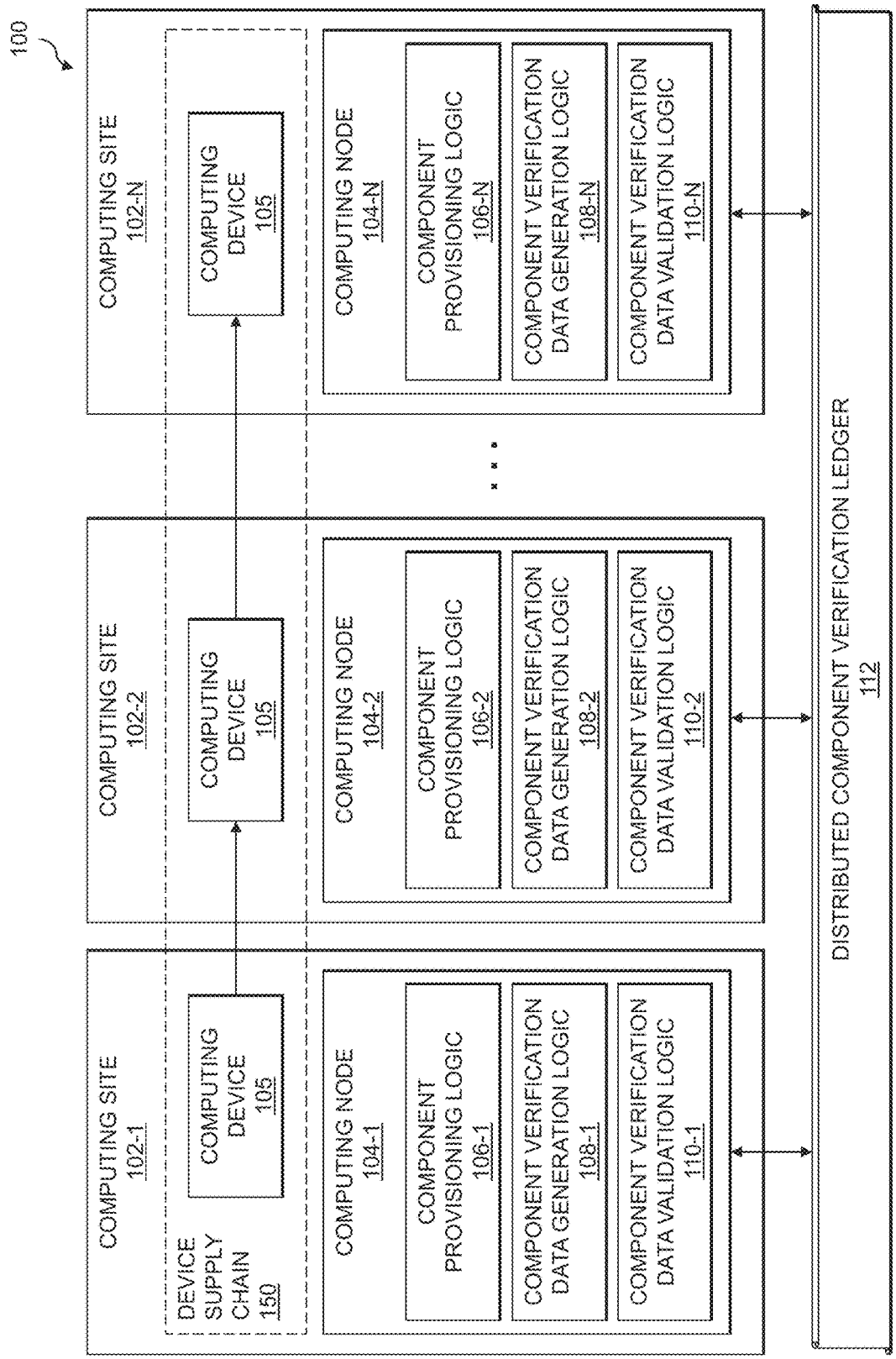
FIG. 1 is a block diagram of an information processing system configured for management of a computing device supply chain utilizing a distributed component verification ledger maintained by entities in the device supply chain in an illustrative embodiment.

FIG. 1 shows an information processing system 100 configured in accordance with an illustrative embodiment. The information processing system 100 is assumed to be built on at least one processing platform and provides functionality for secured component verification for a computing device 105 in a device supply chain 150 comprising a set of computing sites 102-1, 102-2, . . . 102-N (collectively, computing sites 102). The computing sites 102 implement respective computing nodes 104-1, 104-2, . . . 104-N (collectively, computing nodes 104), which implement respective instances of component provisioning logic 106-1, 106-2, . . . 106-N (collectively, component provisioning logic 106), component verification data generation logic 108-1, 108-2, . . . 108-N (collectively, component verification data generation logic 108), and component verification data validation logic 110-1, 110-2, . . . 110-N (collectively, component verification data validation logic 110).

The computing sites 102 in the FIG. 1 embodiment can represent various entities that are part of the device supply chain 150 for computing device 105, and may include a factory or manufacturer, "second touch" facilities, distributors, value-added resellers (VARs), end-users, etc. Each of the computing sites 102 in the device supply chain 150 is assumed to provision or modify the computing device 105 in some way before it is passed to the next one of the computing sites 102 in the device supply chain 150 (e.g., until reaching an end of the device supply chain 150, which may be computing site 102-N representing a customer or end-user of the computing device 105). As each computing site 102 in the device supply chain 150 receives the computing device 105, it may provision one or more components of the computing device 105 utilizing its respective instance of the component provisioning logic 106. Such component provisioning may involve, for example, adding, modifying or removing one or more hardware and software components of the computing device 105.

When the computing device 105 is received at each of the computing sites 102, the computing nodes 104 will verify the components of the computing device 105, utilizing component verification data validation logic 110. This may involve comparing a "fingerprint" or signature of the computing device 105 against records of component provisioning of the computing device which are published to the distributed component verification ledger 112. The distributed component verification ledger 112 may comprise a peer-to-peer blockchain-based distributed ledger. The computing nodes 104 may comprise respective ledger nodes of the distributed component verification ledger 112. The computing nodes 104 (along with additional ledger nodes not explicitly shown in FIG. 1) may collectively maintain the distributed component verification ledger 112 on a peer-to-peer basis without utilizing a centralized transaction authority.

The computing nodes 104 may utilize the component verification data generation logic 108 to generate cryptographic blocks that are entered into the distributed component verification ledger 112, with each of such generated cryptographic blocks characterizing secured component verification data regarding the provisioning actions which are performed on the computing device 105 utilizing the component provisioning logic 106. As discussed above, in some embodiments the distributed component verification ledger 112 comprises a blockchain-based distributed ledger, where a blockchain distributed ledger in some embodiments is implemented at least in part in the form of a distributed database across a public network that maintains a continuously-growing list of records more generally referred to herein as "blocks." Each block illustratively contains a timestamp and a link to a previous block. The blocks are generated using cryptographic techniques in order to allow each participant on the public network to manipulate the blocks in a secure way without the need for a central authority. In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities (e.g., each of the computing sites 102 in the device supply chain 150).

As used herein, the terms "blockchain," "digital ledger" and "blockchain digital ledger" may be used interchangeably. A blockchain or digital ledger protocol is implemented via a distributed, decentralized computer network of compute nodes (computing nodes 104 of the computing sites 102). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all nodes within the network and inspected, a consensus is reached, and the entry is formally committed to the blockchain when consensus is reached that the entry is valid.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

The computing device 105 may comprise, for example, a physical computing device such as an Internet of Things (IoT) device, a mobile telephone, a laptop computer, a tablet computer, a desktop computer or another type of device. Such devices are examples of what are more generally referred to herein as "processing devices." Some of these processing devices are also generally referred to herein as "computers." The computing nodes 104 may similarly comprise processing devices, and may also or alternately comprise virtualized computing resources, such as virtual machines (VMs), containers, etc.

The computing nodes 104 in some embodiments comprise respective computers associated with one or more companies, organizations or other enterprises. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Networks coupling the computing sites 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the computing sites 102 collectively provide at least a portion of an information technology (IT) infrastructure operated by one or more enterprises. The IT infrastructure comprising at least a subset of the computing sites 102 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the computing sites 102 and/or associated computing nodes 104. A given enterprise system may host assets that are associated with multiple enterprises (e.g., two or more different businesses, organizations or other entities). For example, in some cases different ones of the computing sites 102 are associated with different enterprises (e.g., different customers or end-users) which purchase devices from another enterprise (e.g., a manufacturer or vendor of the computing device 105).

Although not explicitly shown in FIG. 1, one or more input-output devices such as keyboards, displays or other types of input-output devices may be used to support one or more user interfaces to the computing sites 102 and/or their associated computing nodes 104, as well as to support communication therebetween and with other related systems and devices not explicitly shown.

Although shown as elements of the computing sites 102 in the FIG. 1 embodiments, one or more the computing nodes 104 or at least portions thereof (e.g., one or more of the component provisioning logic 106, the component verification data generation logic 108 and the component verification data validation logic 110) may in other embodiments be implemented at least in part externally to one or more of the computing sites 102, for example, as stand-alone servers, sets of servers or other types of systems coupled via one or more networks to the computing sites 102.

The computing sites 102, the computing nodes 104 and the distributed component verification ledger 112 in the FIG. 1 embodiment are assumed to be implemented using at least one processing device. Each such processing device generally comprises at least one processor and an associated memory, and implements at least a portion of the functionality of one or more of the component provisioning logic 106, the component verification data generation logic 108, and the component verification data validation logic 110.

It is to be appreciated that the particular arrangement of the computing sites 102, the computing nodes 104 and the distributed component verification ledger 112 illustrated in the FIG. 1 embodiment is presented by way of example only, and alternative arrangements can be used in other embodiments. As discussed above, for example, the computing nodes 104 may in some cases be implemented at least in part external to the computing sites 102. At least portions of the component provisioning logic 106, the component verification data generation logic 108 and the component verification data validation logic 110 may be implemented at least in part in the form of software that is stored in memory and executed by a processor.

It is to be understood that the particular set of elements shown in FIG. 1 for distributed secured component verification of computing devices is presented by way of illustrative example only, and in other embodiments additional or alternative elements may be used. Thus, another embodiment may include additional or alternative systems, devices and other network entities, as well as different arrangements of modules and other components.

The computing sites 102, computing nodes 104, distributed component verification ledger 112 and other portions of the system 100, as will be described above and in further detail below, may be part of cloud infrastructure.

The computing sites 102, computing nodes 104, distributed component verification ledger 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The computing sites 102, or components thereof, may be implemented on respective distinct processing platforms, although numerous other arrangements are possible. For example, in some embodiments at least portions of two or more of the computing sites 102, or components thereof, are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the computing sites 102, or portions or components thereof, to reside in different data centers. Numerous other distributed implementations are possible.

Additional examples of processing platforms utilized to implement the computing sites 102, computing nodes 104, the distributed component verification ledger 112 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for management of a computing device supply chain utilizing a distributed component verification ledger maintained by entities in the device supply chain will now be described in more detail with reference to the flow diagram of FIG. 2. It is to be understood that this particular process is only an example, and that additional or alternative processes for management of a computing device supply chain utilizing a distributed component verification ledger maintained by entities in the device supply chain may be used in other embodiments.

In this embodiment, the process includes steps 200 through 204. These steps are assumed to be performed by the computing nodes 104 utilizing the component provisioning logic 106, the component verification data generation logic 108, the component verification data validation logic 110, and the distributed component verification ledger 112. The process begins with step 200, obtaining, at a given one of a plurality of computing sites (e.g., 102) in a supply chain (e.g., 150) associated with a given computing device (e.g., 105), one or more component verification data records associated with the given computing device, the one or more component verification data records being obtained from a distributed ledger (e.g., 112) maintained by the plurality of computing sites in the supply chain, the one or more component verification data records characterizing one or more provisioning actions performed on the given computing device by at least one of the computing sites in the plurality of computing sites in the supply chain. In some embodiments, the at least one computing site is a computing site other than the given computing site. The distributed ledger may comprise a blockchain ledger, and the one or more component verification data records associated with the given computing device may be associated with one or more cryptographic blocks in the blockchain ledger.

The one or more component verification data records may be digitally signed utilizing cryptographic keys associated with the at least one computing site in the plurality of computing sites in the supply chain that performed the one or more provisioning actions on the given computing device. The one or more provisioning actions performed on the given computing device may comprise at least one of: adding at least one of one or more hardware components and one or more software components to the given computing device; removing at least one of one or more hardware components and one or more software components from the given computing device; and modifying at least one of one or more hardware components and one or more software components of the given computing device.

The one or more component verification data records associated with the given computing device may comprise a digital bill of materials generated by a manufacturer of the given computing device. The given computing site may comprise at least one of a distributor and a value-added reseller in the supply chain, and the one or more component verification data records associated with the given computing device may be generated by at least one of a factory and a second touch facility in the supply chain. The given computing device may be associated with one or more smart contracts specifying (i) provisioning actions to be performed for the given computing device and (ii) rewards to be provided in response to performance of the provisioning actions. The one or more component verification data records may comprise a first component verification data record comprising a shopfloor integration system bill of materials secured component verification data record generated by a first one of the plurality of computing sites in the supply chain, and at least a second component verification data record comprising metadata representing one or more provisioning actions performed at one or more subsequent ones of the plurality of computing sites in the supply chain that modify the shopfloor integration system bill of materials secured component verification data record.

In step 202, component verification data for the given computing device is generated. The component verification data characterizes a current configuration of hardware and software components of the given computing device. The component verification data for the given computing device may be generated utilizing one or more firmware-based utilities of the given computing device. The generated component verification data for the given computing device may comprise device health data for the given computing device obtained from an integrated remote access controller of the given computing device. Step 202 may be performed by scanning one or more quick response codes associated with the given computing device. An authenticity of the given computing device is determined in step 204 based at least in part on validating the generated component verification data for the given computing device utilizing the one or more component verification data records associated with the given computing device obtained from the distributed ledger.

The generated component verification data may comprise a digital bill of materials for the given computing device, and validating the generated component verification data for the given computing device may comprise: verifying a digital signature of contents of the digital bill of materials for the given computing device received from an upstream computing site in the supply chain; determining a first checksum of contents of the digital bill of materials received from the upstream computing site in the supply chain; and verifying that the first checksum of the contents of the digital bill of materials received from the upstream computing site in the supply chain matches (i) a second checksum stored in the one or more component verification data records obtained from the distributed ledger and (ii) a third checksum of the generated component verification data characterizing the current configuration of hardware and software components of the given computing device.

Figure 2:
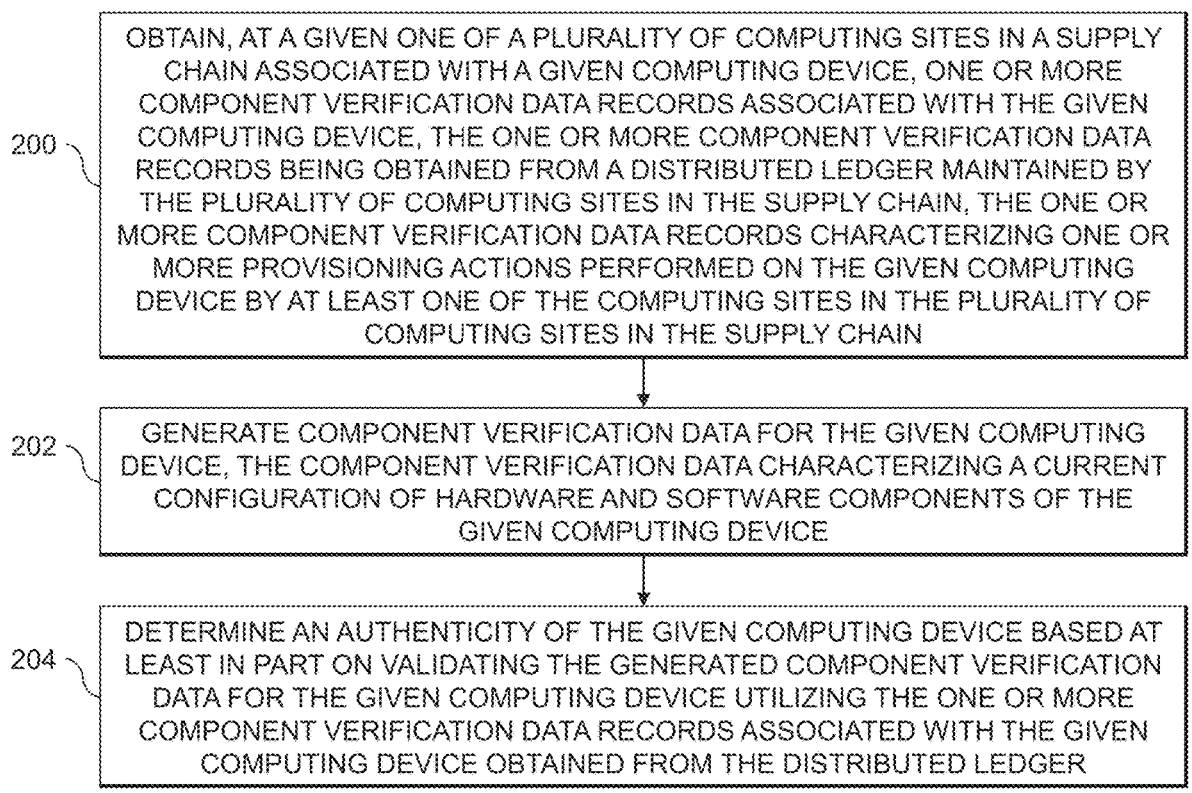
FIG. 2 is a flow diagram of an exemplary process for management of a computing device supply chain utilizing a distributed component verification ledger maintained by entities in the device supply chain in an illustrative embodiment.

The FIG. 2 process may further include performing, at the given computing site responsive to a successful validation of the generated component verification data for the given computing device, one or more additional provisioning actions on the given computing device and generating, at the given computing site, updated component verification data for the given computing device. The updated component verification data characterizes the one or more additional provisioning actions performed on the given computing device at the given computing site. The updated component verification data is provided to the distributed ledger maintained by the plurality of computing sites in the supply chain for entry into one or more additional component verification data records associated with the given computing device. The updated component verification data provided to the distributed ledger may be digitally signed utilizing a cryptographic key associated with the given computing site.

Illustrative embodiments provide solutions for distributing secured component verification (SCV) data over a ledger (e.g., distributed component verification ledger 112), which provides functionality for having measurements of trusted parties and their additions to the components of computing devices (e.g., computing device 105) that are shipped through a supply chain (e.g., device supply chain 150) from vendor or manufacturer controlled facilities, through distribution and VAR ecosystems, etc. (e.g., at different computing sites 102). The distributed SCV ledger also provides functionality for "fingerprinting" each action in the supply chain (e.g., the component provisioning performed at each of the computing sites 102 in the device supply chain 150). Such techniques enable an end-to-end trusted supply chain, which can be validated by each entity (e.g., each computing site 102) in the supply chain through SCV measurements that are added to the ledger (e.g., the distributed component verification ledger 112). Each ownership transfer (e.g., between computing sites 102 in the device supply chain 150) may be associated with an SCV checkpoint, where new SCV data is added to the ledger (e.g., the distributed component verification ledger 112) and is signed by the trusted party.

There is a need for approaches which enable application of SCV to a system or supply chain that incorporates third parties to exchange components in the system, even where a Shop Floor Integration System (SFIS) is rooted in a manufacturer or vendor factory (e.g., which first manufactures computing devices in a supply chain). Generally, the SFIS is inside the manufacturer or vendor factory, and cannot leave that facility. Illustrative embodiments provide mechanisms for assuring that each trusted party in the supply chain can submit additions into a distributed SCV ledger (e.g., distributed component verification ledger 112). In this way, the full supply chain can be validated, and any unexpected intrusion or interception can be detected.

Managing trust in hardware that is shipped from a vendor controlled computing site (e.g., a vendor factory) can be facilitated using SCV, which allows for validating that the hardware which was shipped from the vendor controlled computing site is received by the customer or end-user. The techniques described herein enable incorporating the full supply chain (e.g., from a vendor to a customer or other end-user, including all parties that add value to the product that is shipped from the vendor to the customer or other end-user). The full supply chain, for example, may include second touch facilities, distributors, VARs, system integrators (SIs), etc., which may add modifications to the product (e.g., a computing device) which can interfere with or affect the stored values of the SCV in the product. This can break trust in the supply chain.

Figure 3:
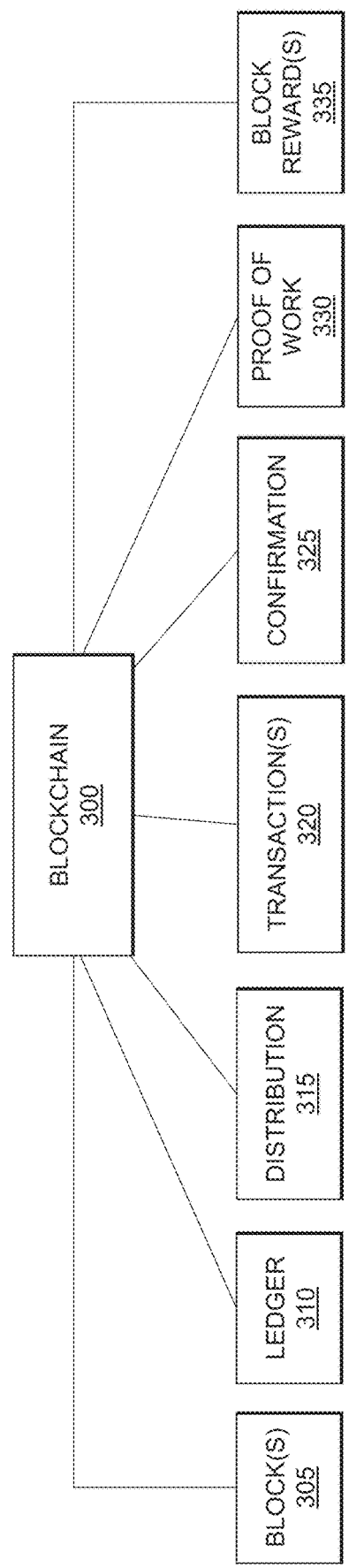
FIG. 3 shows an implementation of a blockchain architecture which may be used for implementing a distributed secured component verification ledger in an in illustrative embodiment.

FIG. 3 shows an example architecture for a blockchain 300 which may be used in implementing a distributed SCV ledger (e.g., distributed component verification ledger 112), where provisioning actions taken by different entities in a device supply chain are added to the distributed SCV ledger using the blockchain 300. In this way, each individual action in the supply chain contributes to the final distributed SCV ledger. Each party in the supply chain (e.g., the trust chain) will add components or otherwise perform provisioning actions for a computing device, and enter such information as transactions in the distributed SCV ledger as part of the blockchain 300. The metadata of the transactions will be added to the distributed SCV ledger. Thus, some embodiments can contribute to and be compliant with various standards and specifications, including International Organization for Standardization (ISO) 28000: Supply Chain Management specifications, Secure Device Onboarding (SDO) specifications, multi-phase secure zero touch provisioning (MPSZTP) specifications, etc.

As shown in FIG. 3, the blockchain 300 includes various components and functionality, including: blocks 305; ledger 310; distribution 315; transactions 320; confirmation 325; proof of work 330; and block rewards 335. The blocks 305, as noted above, may include sets of the transactions 320 which are entered into the ledger 310, with the ledger 310 being distributed 315 across ledger nodes that are part of the blockchain 300. The blockchain 300 may be used to provide confirmation 325 of the transactions 320, with the transactions 320 being entered as the block 305 in the ledger 310 in accordance with a proof of work 330 mechanism the provides block rewards 335 to participants. The blockchain 300 provides a distributed ledger 310, similar to a database, which has various key attributes including but not limited to: it is decentralized and there are no third parties involved; it is distributed, meaning the ledger 310 is spread across the whole network making tampering difficult; it is encrypted; it is anonymous; once data is added to the ledger, it cannot be removed or altered; etc.

Consider, as an example, that a user "Alice" wants to send money to a user "Bob." This can be represented as a given one of the transactions 320, which is added to a given one of the blocks 305. The given block 305 is broadcast to the whole network (e.g., to all ledger nodes participating in the blockchain 300 using distribution 315 functionality). The network (e.g., the ledger nodes) will then approve the given transaction 320 (e.g., by solving equations to confirm the validity of the given transaction 320 and possibly one or more additional transactions that are part of the given block 305). Once confirmed to be legitimate, the given block 305 is added to the existing ledger 310 (e.g., with the given block 305 being chained together with the other blocks 305 in the ledger 310) and the transaction 320 is considered to be complete. Block rewards 335 are provided to the ledger nodes that validate the blocks 305 entered into the ledger 310, based on the proof of work 330 submitted by the ledger nodes.

It should be noted that the blockchain 300 may utilize different formats, including public permissionless and private permitted ledger formats. In a public permissionless ledger, read and write access is public to anyone, while in a private permitted ledger read and write access is upon invitation only. The network actors do not necessarily know one another in a public permissionless ledger, but the network actors do know one another in a private permitted ledger. A native token is typically used in a public permissionless ledger, but is not necessary for a private permitted ledger. Security in a public permissionless ledger may be provided via economic incentives (e.g., proof of work, proof of stake, proof of space, proof of burn, etc.). Security in a private permitted ledger may be provided through legal contracts, proof of authority, etc. Generally, public permissionless ledgers are slower than private permitted ledgers. A public permissionless ledger has the potential to disrupt conventional business models at least in part through disintermediation, and can advantageously result in lower infrastructure costs (e.g., as there is no need to maintain servers and system administrators) and can reduce costs of creating and running decentralized applications (dApps). A private permitted ledger can reduce transaction costs and data redundancies through replacing legacy systems, simplifying document handling, reducing reliance on manual compliance mechanisms, etc. Examples of public permissionless ledgers include Bitcoin, Ethereum, Monero, Zcah, Steemit, Dash, Litecoin, Stellar, etc. Examples of private permitted ledgers include R3 (banking), EWF (energy), B3i (insurance), Corda (financial services), etc.

Figure 4A:
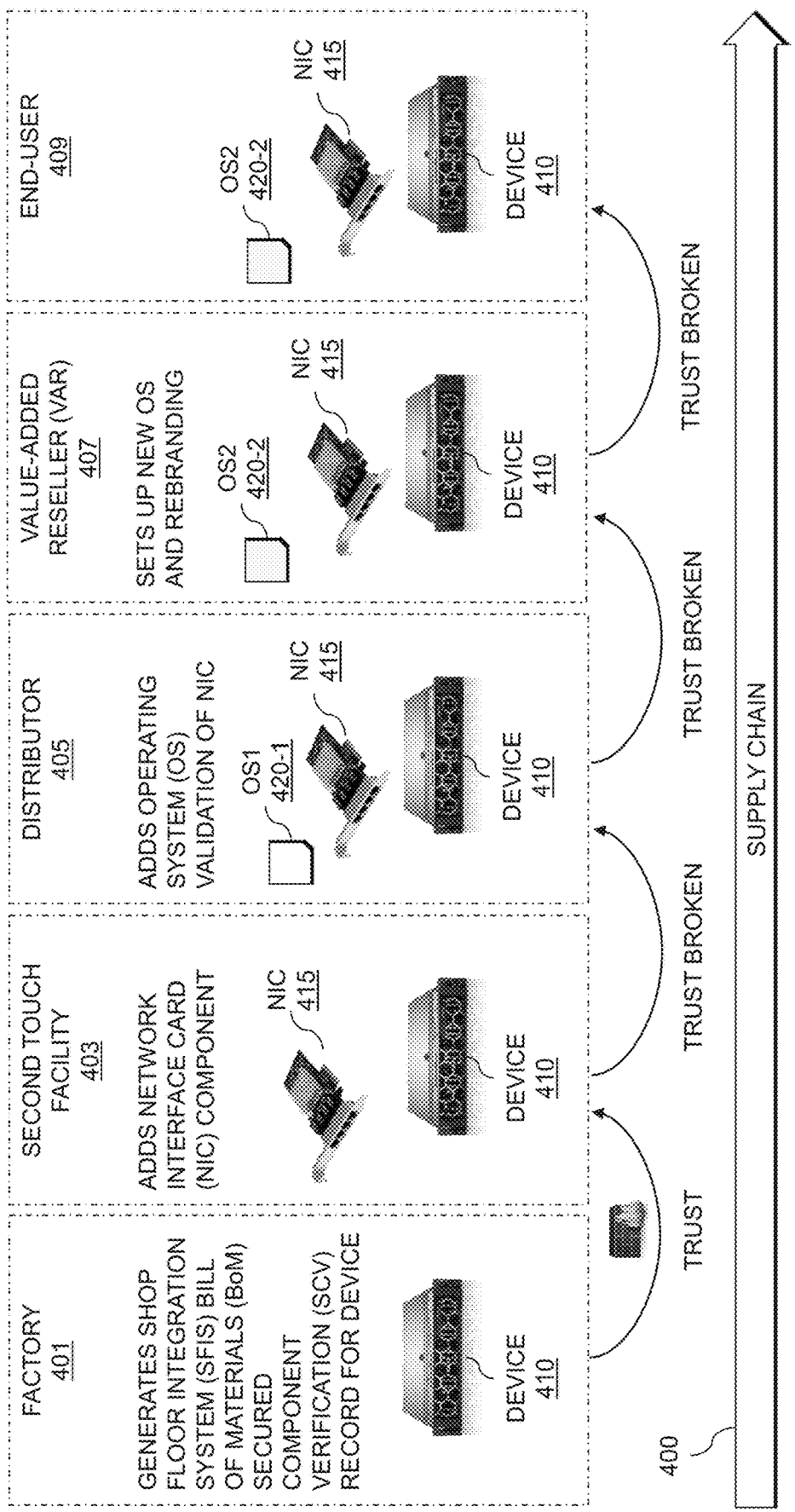
FIGS. 4A and 4B show management of a supply chain without and with use of a distributed secured component verification ledger in an illustrative embodiment.
Figure 4B:
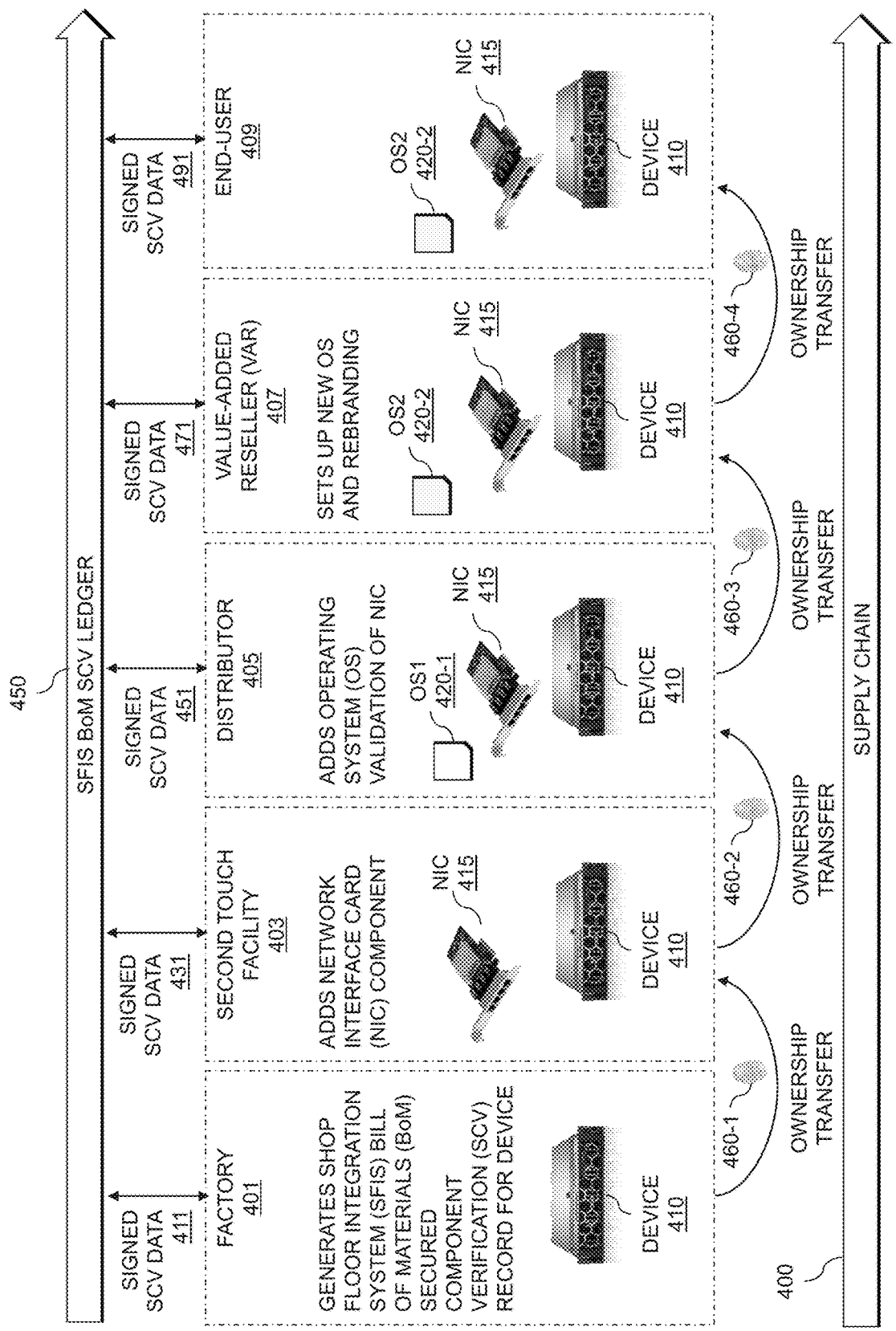

FIGS. 4A and 4B show examples of management of a device supply chain 400, without and with use of a distributed SCV ledger. As shown in FIGS. 4A and 4B, the device supply chain 400 includes various computing sites or entities, including a factory 401, a second touch facility 403, a distributor 405, a VAR 407 and an end-user 409. Consider, as an example, where the distributor 405 purchases a product (e.g., computing device 410) from a vendor or manufacturer that operates the factory 401. The computing device 410 is manufactured at the factory 401. The factory 401 utilizes a SFIS and a bill of materials (BoM) to generate a SCV record for the computing device 410. Before the computing device 410 is shipped to the distributor 405, the second touch facility 403 may add hardware or software components to the computing device 410. In the FIG. 4A example, the second touch facility 403 adds a network interface card (NIC) 415. With this action, the trust that is given through use of the SCV record generated at the factory 401 is broken (e.g., due to the addition of the add-on card). When the add-on card (e.g., the NIC 415) is added to the computing device 410, the SCV value for the computing device 410 will be different than the SCV value or record generated by the factory 401. As a result, the distributor 405 will not be able to make use of the trust (e.g., the SCV record) provided by the operator of the factory 401.

In the FIG. 4A example, trust is broken once the second touch facility 403 modifies the computing device 410 via addition of the NIC 415. The trust is further broken via additional actions taken at the distributor 405 and the VAR 407. The distributor 405, for example, can add an OS 420-1 validation of the NIC 415 in the computing device 410 (e.g., where the NIC 415 is added by the second touch facility 403). The VAR 407 may set up a new OS 420-2 (e.g., different than the OS 420-1) on the computing device 410, and may also re-brand the computing device 410 before delivering the computing device 410 to the end-user 409. Such re-branding may include, but is not limited to, altering a physical appearance of the computing device 410 (e.g., a housing or chassis, labels or logos affixed thereto) as well as modifying hardware and/or software components of the computing device 410. This may include, for example, setup of a customized OS 420-2 for the end-user 409 (which may replace the OS 420-1, or be installed as an additional OS).

FIG. 4B shows management of the device supply chain 400 with the use of a distributed SCV ledger, shown as SFIS BoM SCV ledger 450. Each of the entities in the device supply chain 400 will sign SCV data that is added to the SFIS BoM SCV ledger 450—the factory 401 supplies signed SCV data 411; the second touch facility 403 supplies signed SCV data 431; the distributor 405 supplies signed SCV data 451; and the VAR 407 supplies signed SCV data 471. The end-user 409 can retrieve signed SCV data 491 from the SFIS BoM SCV ledger 450 in order to verify the computing device 410. With each ownership transfer (e.g., between entities in the supply chain 400), a "fingerprint" is provided which represents proof of work (e.g., 460-1, 460-2, 460-3 and 460-4, collectively proof of work fingerprints 460) performed by the entity initiating the ownership transfer. The signed SCV data 411, 431, 451, 471 and 491 can be utilized by entities in the device supply chain 400 in order to verify the ownership transfer in a trusted manner. In this way, each ownership transfer is added to the SCV record for the computing device 410 in the SFIS BoM SCV ledger 450 (e.g., as signed SCV data 411, 431, 451, 471, 491), with any entity in the device supply chain 400 being able to utilize the SCV record for the computing device 410 to verify or validate the integrity of the computing device 410.

As noted above, each ownership transfer in the device supply chain 400 involves creation of one of the proof of work fingerprints 460. In some embodiments, the proof of work fingerprints 460 are generated from within the computing device 410, such as utilizing functionality of a basic input-output system (BIOS), other firmware or a software utility of the computing device 410 (e.g., which may run within an OS running on the computing device 410). In some embodiments, for example, the generation and verification of proof of work fingerprints 460 is performed utilizing a BIOS plugin or an executable. The proof of work fingerprints 460 and SCV records may in some cases be generated utilizing a Platform Certificate Profile (PCP) of the computing device 410. Advantageously, creation of a new one of the proof of work fingerprints 460 cannot interfere with previous proof of work fingerprints 460 which are stored in the SFIS BoM SCV ledger 450 (e.g., as the signed SCV data 411, 431, 451, 471, 491). In some embodiments, the generation of a given one of the proof of work fingerprints 460 may be automated (e.g., through the use of quick response (QR) codes or other barcode). The current "owner" of the computing device 410 will have full visibility of the changes made to the computing device 410 in the device supply chain 400 utilizing the SCV record for the computing device 410 that is made part of the SFIS BoM SCV ledger 450. If such changes are in the trusted chain of signed SCV data, the computing device 410 can be classified as valid.

Each trusted party in the device supply chain 400 is permitted to add to the SFIS BoM SCV ledger 450 (e.g., using a blockchain mechanism). This provides proof of the "work" or other provisioning that is performed by each of the entities in the device supply chain 400, which can be added prior to shipment to a follow-on recipient of the computing device 410 in the device supply chain 400. The follow-on recipient will receive the ownership transfer along with one of the proof of work fingerprints 460 representing the actions that have been taken on the computing device 410. Thus, there will be full visibility of the handovers between parties or entities in the device supply chain 400. With each handover, new SCV values (e.g., signed SCV data 411, 431, 451, 471, 491) are created, and the SCV values can be added or retrieved from the SFIS BoM SCV ledger 450.

The SFIS BoM SCV ledger 450 can provide various advantages relative to conventional approaches, such as Fast ID Online (FIDO) Device Onboarding (FDO), which can provide ownership transfer but which does not facilitate proof of work transfer. SCV values may conventionally be rooted in a trusted platform module (TPM) of the computing device 410. Conventionally, the SCV data would be stored in a single database that is controlled by the vendor or manufacturer (e.g., the operator of the factory 401 in the device supply chain 400). Delta certificates could be used for handling SCV changes (e.g., as the computing device 410 moves among entities in the device supply chain 400), but still leaves the SCV rooted to the TPM and thus could not go beyond the boundaries of the vendor or manufacturer's facilities (e.g., the factory 401 in the device supply chain 400). The TPM cannot facilitate the trust contract between parties in the device supply chain 400. Further, the TPM is a single root of trust, and the hardware can break. With multiple root of trusts in the SFIS BoM SCV ledger 450, traceability of the SCV identity of the computing device 410 is warranted.

Using the SFIS BoM SCV ledger 450, parties in the device supply chain 400 can add, remove or modify hardware and/or software components of the computing device 410, and add such actions to the SCV record for the computing device 410 that is stored in the SFIS BoM SCV ledger 450. In this way, new SCV values can be associated with the computing device 410. Each entity in the device supply chain 400 can make use of the trust provided by the SCV record for the computing device 410, and has full visibility of re-calculated values for the SCV of the computing device 410 across the device supply chain 400.

Figure 5:
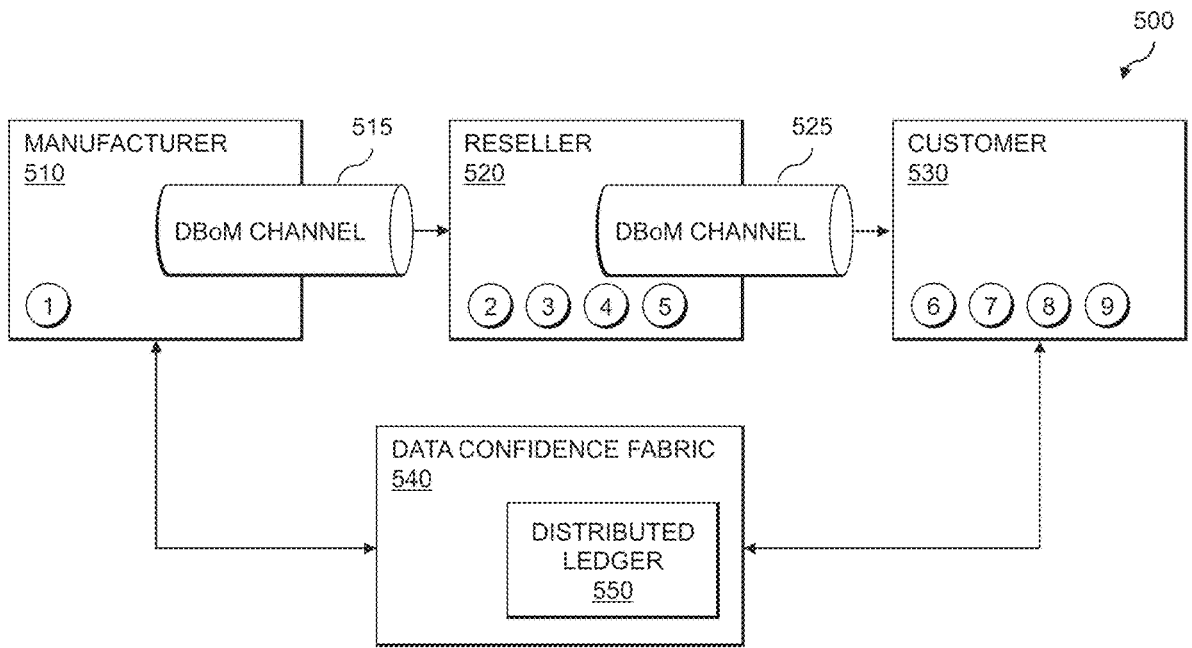
FIG. 5 shows a system flow for use of a distributed secured component verification ledger for supply chain management in an illustrative embodiment.

FIG. 5 shows a system flow for use of a distributed ledger 550 (e.g., a distributed SCV ledger) in a device supply chain 500. The device supply chain 500 includes a manufacturer 510, a reseller 520, a customer 530, and a data confidence fabric 540 that implements the distributed ledger 550. The manufacturer 510 and reseller 520 implement respective digital BoM (DBoM) channels 515 and 525 for communication of proof of work fingerprints among the manufacturer 510, the reseller 520 and the customer 530. The system flow includes Steps 1-9:

1. The manufacturer 510 creates an initial BoM, which may be published to the distributed ledger 550. The manufacturer 510 is assumed to manufacture or otherwise provision a given computing device (not shown) that is provided to the reseller 520.
2. The manufacturer 510 and the reseller 520 establish secure DBoM channel communications utilizing the DBoM channel 515. The secure DBoM channel communications may utilize transport layer security (TLS).
3. The reseller 520 verifies the upstream provider's signature of the BoM contents. Here, the upstream provider is the manufacturer 510. The reseller 520 may receive a proof of work fingerprint associated with the given computing device from the manufacturer 510 via the DBoM channel 515, and then verifies that proof of work fingerprint against the SCV records for the given computing device that are stored in the distributed ledger 550.
4. The BoM contents are validated by the reseller 520 using a hash or checksum.
5. The reseller 520 will perform some modification of the given computing device (e.g., adds, modifies or removes material which may include hardware and/or software components of the given computing device), which causes a "mutation" or change in the BoM for the given computing device. This results in a change in the SCV value for the given computing device, with the updated SCV value being stored in the distributed ledger 550. The given computing device may then be provided to the customer 530.
6. The reseller 520 and the customer 530 establish secure DBoM channel communications utilizing the DBoM channel 525. The secure DBoM channel communications may utilize TLS.
7. The customer 530 verifies the upstream provider's signature of the BoM contents. Here, the upstream provider is the reseller 520. The customer 530 may receive a proof of work fingerprint associated with the given computing device from the reseller 520 via the DBoM channel 525, and then verifies that proof of work fingerprint against the SCV records for the given computing device that are stored in the distributed ledger 550.
8. The customer 530 will verify BoM contents using a hash or checksum.
9. The customer 530 will also verify a third party provider signature (e.g., a signature of the reseller 520) for specialized components or other actions taken by the reseller 520 (e.g., which result in the mutation of the BoM).

Use of a distributed SCV ledger (e.g., distributed component verification ledger 112, SFIS BoM SCV ledger 450, distributed ledger 550) provides unique value propositions for full lifecycle management visibility. This includes advantages through providing visibility on the full supply chain as well as visibility on proof of work. Visibility on the full supply chain includes the ability to extend an SCV device identity (e.g., SFIS BoM, DBoM, TPM2 platform signature) outside a manufacturer or vendor of a computing device and its associated TPM. This advantageously provides improved identity on the manufacturer or vendor's delivered derivatives through the supply chain, such as for ISO-28000 supply chain security. The distributed SCV ledger can also enable smart contracts between parties in the supply chain. The distributed SCV ledger can further be used to bring supply chain reliability confidence ratings (e.g., utilizing Alvarium). The distributed SCV ledger can also enable governance by independent foundations, and full visibility (e.g., using IOTA Chronicle).

The distributed SCV ledger can also provide visibility on proof of work as an add on to ownership transfer, which is not enabled by conventional FIDO or SDO approaches. The addition of smart contracts can also enable the inclusion of service level agreements (SLAs), as well as the inclusion of cost and payment for work. Further, the distributed SCV ledger can provide proof of work which is especially suited for edge computing environments including multiple parties and contractors (e.g., software and/or hardware manufacturers, independent software vendors (ISVs), VARs, solutions providers, installers, etc.). The proof of work also provides the ability to add Quarantine Action Measure (QAM), device health data (e.g., from an Integrated Dell Remote Access Controller (iDRAC), Linux monitoring sensors (1 m-sensors), global positioning system (GPS), software BoM or DBoM, etc.), etc. Further, the proof of work may be automated and trusted, even for entities in a device supply chain in edge environments which may be extra vulnerable for interception by malicious actors. In some cases, a distributed SCV ledger may also or alternatively be used for proof of validity of VMs or software containers (e.g., based on SBoM) to prove legitimacy and proof of work if ownership of VMs or software containers are transferred between cloud instances.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for management of a computing device supply chain utilizing a distributed component verification ledger maintained by entities in the device supply chain will now be described in greater detail with reference to FIGS. 6 and 7. Although described in the context of system 100, these platforms may also be used to implement at least portions of other information processing systems in other embodiments.

Figure 6:
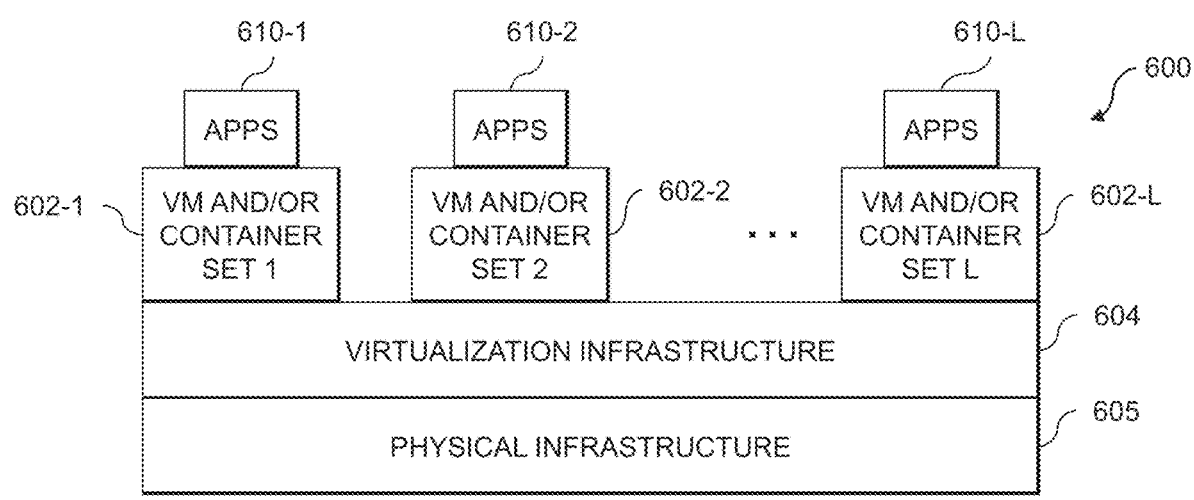
FIGS. 6 and 7 show examples of processing platforms that may be utilized to implement at least a portion of an information processing system in illustrative embodiments.
Figure 7:
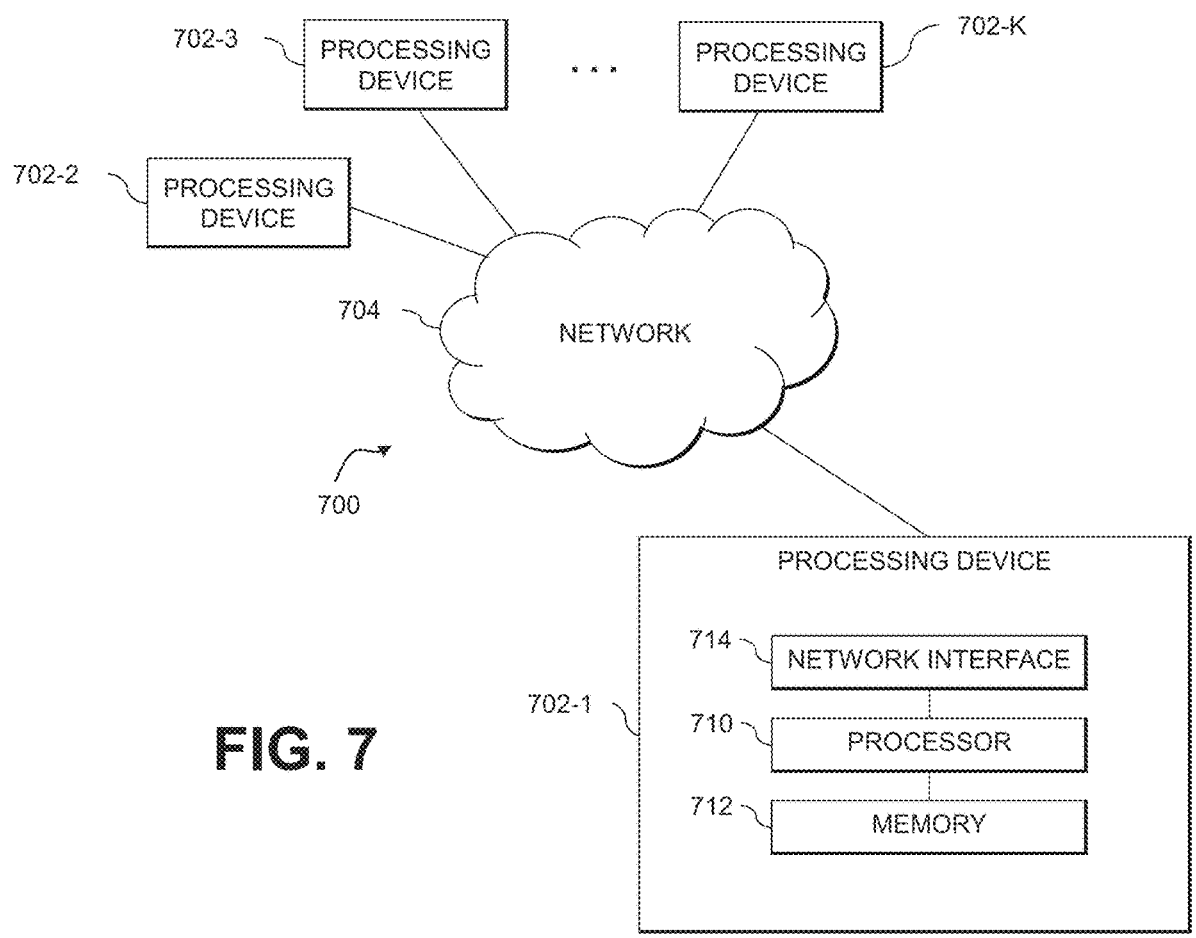

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for multi-phase secure zero touch provisioning of computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining, at a given one of a plurality of computing sites in a supply chain associated with a given computing device, one or more component verification data records associated with the given computing device, the one or more component verification data records being obtained from a distributed ledger maintained by the plurality of computing sites in the supply chain, the one or more component verification data records characterizing one or more provisioning actions performed on the given computing device by at least one of the computing sites in the plurality of computing sites in the supply chain;

generating component verification data for the given computing device, the generated component verification data characterizing a current configuration of hardware and software components of the given computing device;

obtaining, from another one of the plurality of computing sites in the supply chain, a digital bill of materials for the given computing device; and determining an authenticity of the given computing device based at least in part on validating the digital bill of materials utilizing (i) the generated component verification data characterizing the current configuration of hardware and software components of the given computing device and (ii) the one or more component verification data records associated with the given computing device and obtained from the distributed ledger.

2. The apparatus of claim 1 wherein the distributed ledger comprises a blockchain ledger, and wherein the one or more component verification data records associated with the given computing device are associated with one or more cryptographic blocks in the blockchain ledger.

3. The apparatus of claim 1 wherein the one or more component verification data records are digitally signed utilizing cryptographic keys associated with the at least one of the computing sites in the plurality of computing sites in the supply chain that performed the one or more provisioning actions on the given computing device.

4. The apparatus of claim 1 wherein the one or more provisioning actions performed on the given computing device comprise at least one of:

adding at least one of one or more hardware components and one or more software components to the given computing device;

removing at least one of one or more hardware components and one or more software components from the given computing device; and modifying at least one of one or more hardware components and one or more software components of the given computing device.

5. The apparatus of claim 1 wherein the component verification data for the given computing device is generated utilizing one or more firmware-based utilities of the given computing device.

6. The apparatus of claim 1 wherein generating the component verification data for the given computing device comprises scanning one or more quick response codes associated with the given computing device.

7. The apparatus of claim 1 wherein the at least one processing device is further configured to perform the steps of:

performing, at the given computing site responsive to a successful validation of the generated component verification data for the given computing device, one or more additional provisioning actions on the given computing device;

generating, at the given computing site, updated component verification data for the given computing device, the updated component verification data characterizing the one or more additional provisioning actions performed on the given computing device at the given computing site; and providing, to the distributed ledger maintained by the plurality of computing sites in the supply chain, the updated component verification data for entry into one or more additional component verification data records associated with the given computing device.

8. The apparatus of claim 7 wherein the updated component verification data provided to the distributed ledger is digitally signed utilizing a cryptographic key associated with the given computing site.

9. The apparatus of claim 1 wherein the one or more component verification data records associated with the given computing device comprise a digital bill of materials generated by a manufacturer of the given computing device.

10. The apparatus of claim 1 wherein the given computing site comprises at least one of a distributor and a value-added reseller in the supply chain, and wherein the one or more component verification data records associated with the given computing device are generated by at least one of a factory and a second touch facility in the supply chain.

11. The apparatus of claim 1 wherein the generated component verification data for the given computing device comprises device health data for the given computing device obtained from an integrated remote access controller of the given computing device.

12. The apparatus of claim 1 wherein the given computing device is associated with one or more smart contracts specifying (i) provisioning actions to be performed for the given computing device and (ii) rewards to be provided in response to performance of the provisioning actions.

13. The apparatus of claim 1 wherein validating the digital bill of materials comprises:

verifying a digital signature of contents of the digital bill of materials for the given computing device received from the other one of the plurality of computing sites in the supply chain;

determining a first checksum of contents of the digital bill of materials received from the other one of the plurality of computing sites in the supply chain; and verifying that the first checksum of the contents of the digital bill of materials received from the other one of the plurality of computing sites in the supply chain matches (i) a second checksum stored in the one or more component verification data records obtained from the distributed ledger and (ii) a third checksum of the generated component verification data characterizing the current configuration of hardware and software components of the given computing device.

14. The apparatus of claim 1 wherein the one or more component verification data records comprise:

a first component verification data record comprising a shopfloor integration system bill of materials secured component verification data record generated by a first one of the plurality of computing sites in the supply chain; and at least a second component verification data record comprising metadata representing one or more provisioning actions performed at one or more subsequent ones of the plurality of computing sites in the supply chain that modify the shopfloor integration system bill of materials secured component verification data record.

15. A computer program product comprising a non-transitory processor-readable storage medium having stored therein program code of one or more software programs, wherein the program code when executed by at least one processing device causes the at least one processing device to perform steps of:

obtaining, at a given one of a plurality of computing sites in a supply chain associated with a given computing device, one or more component verification data records associated with the given computing device, the one or more component verification data records being obtained from a distributed ledger maintained by the plurality of computing sites in the supply chain, the one or more component verification data records characterizing one or more provisioning actions performed on the given computing device by at least one of the computing sites in the plurality of computing sites in the supply chain;

generating component verification data for the given computing device, the component verification data characterizing a current configuration of hardware and software components of the given computing device;

obtaining, from another one of the plurality of computing sites in the supply chain, a digital bill of materials for the given computing device; and determining an authenticity of the given computing device based at least in part on validating the digital bill of materials utilizing (i) the generated component verification data characterizing the current configuration of hardware and software components of the given computing device and (ii) the one or more component verification data records associated with the given computing device and obtained from the distributed ledger.

16. The computer program product of claim 15 wherein the program code when executed by at least one processing device further causes the at least one processing device to perform steps of:

performing, at the given computing site responsive to a successful validation of the generated component verification data for the given computing device, one or more additional provisioning actions on the given computing device;

generating, at the given computing site, updated component verification data for the given computing device, the updated component verification data characterizing the one or more additional provisioning actions performed on the given computing device at the given computing site; and providing, to the distributed ledger maintained by the plurality of computing sites in the supply chain, the updated component verification data for entry into one or more additional component verification data records associated with the given computing device.

17. The computer program product of claim 15 wherein validating the digital bill of materials comprises:

verifying a digital signature of contents of the digital bill of materials for the given computing device received from the other one of the plurality of computing sites in the supply chain;

determining a first checksum of contents of the digital bill of materials received from the other one of the plurality of computing sites in the supply chain; and verifying that the first checksum of the contents of the digital bill of materials received from the other one of the plurality of computing sites in the supply chain matches (i) a second checksum stored in the one or more component verification data records obtained from the distributed ledger and (ii) a third checksum of the generated component verification data characterizing the current configuration of hardware and software components of the given computing device.

18. A method comprising:

obtaining, at a given one of a plurality of computing sites in a supply chain associated with a given computing device, one or more component verification data records associated with the given computing device, the one or more component verification data records being obtained from a distributed ledger maintained by the plurality of computing sites in the supply chain, the one or more component verification data records characterizing one or more provisioning actions performed on the given computing device by at least one of the computing sites in the plurality of computing sites in the supply chain;

generating component verification data for the given computing device, the component verification data characterizing a current configuration of hardware and software components of the given computing device;

obtaining, from another one of the plurality of computing sites in the supply chain, a digital bill of materials for the given computing device; and determining an authenticity of the given computing device based at least in part on validating the digital bill of materials utilizing (i) the generated component verification data characterizing the current configuration of hardware and software components of the given computing device and (ii) the one or more component verification data records associated with the given computing device and obtained from the distributed ledger;

wherein the method is performed by at least one processing device comprising a processor coupled to a memory.

19. The method of claim 18 further comprising:

performing, at the given computing site responsive to a successful validation of the generated component verification data for the given computing device, one or more additional provisioning actions on the given computing device;

generating, at the given computing site, updated component verification data for the given computing device, the updated component verification data characterizing the one or more additional provisioning actions performed on the given computing device at the given computing site; and providing, to the distributed ledger maintained by the plurality of computing sites in the supply chain, the updated component verification data for entry into one or more additional component verification data records associated with the given computing device.

20. The method of claim 18 wherein validating the digital bill of materials comprises:

verifying a digital signature of contents of the digital bill of materials for the given computing device received from the other one of the plurality of computing sites in the supply chain;

determining a first checksum of contents of the digital bill of materials received from the other one of the plurality of computing sites in the supply chain; and verifying that the first checksum of the contents of the digital bill of materials received from the other one of the plurality of computing sites in the supply chain matches (i) a second checksum stored in the one or more component verification data records obtained from the distributed ledger and (ii) a third checksum of the generated component verification data characterizing the current configuration of hardware and software components of the given computing device.

* * * * *